Dec. 1, 1959 F. C. BADALICH 2,914,985
SLIDE CHANGER AND SHUTTER FOR STEREOSCOPIC PROJECTORS
Original Filed Aug. 24, 1954 10 Sheets-Sheet 1
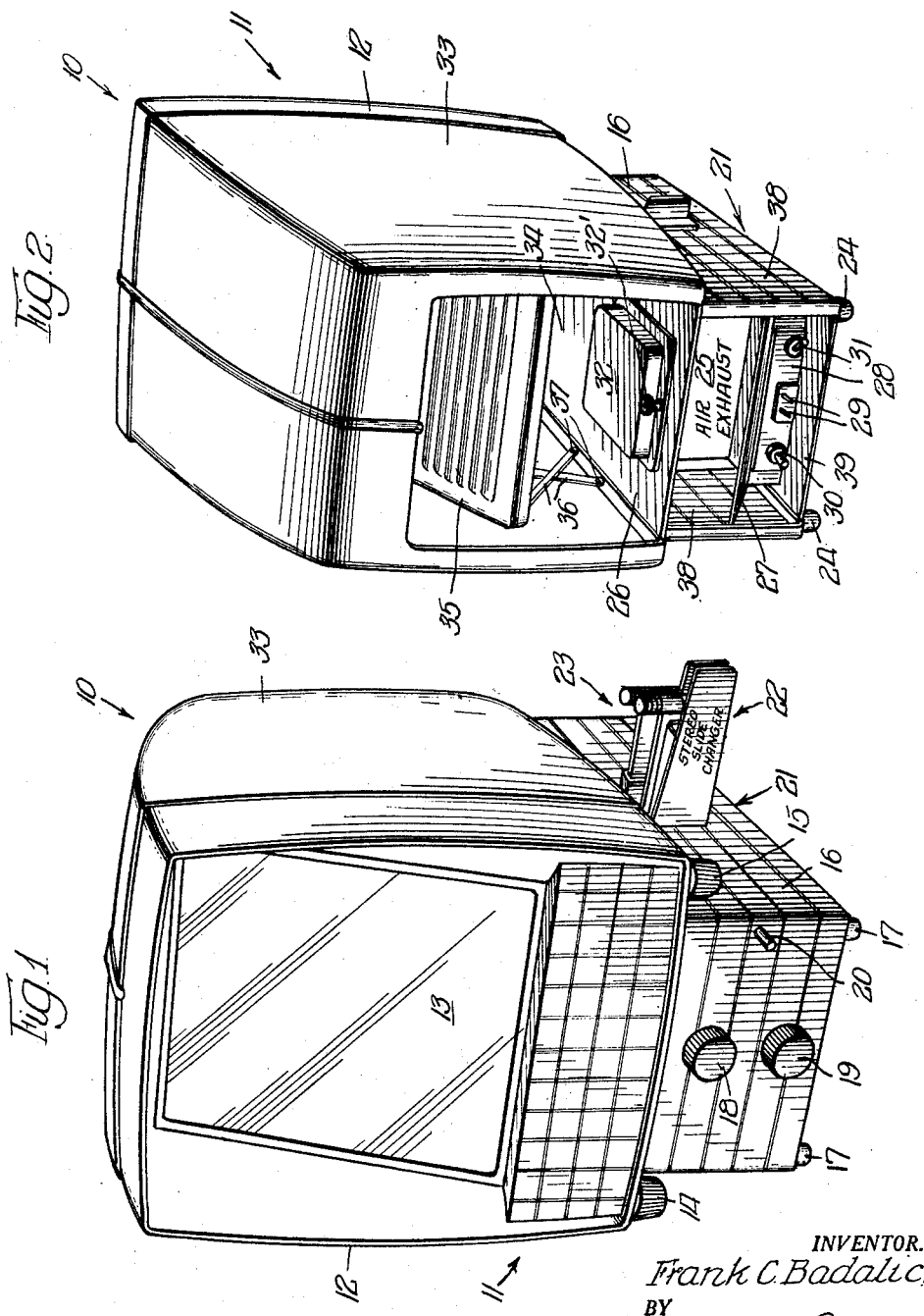
INVENTOR.
Frank C. Badalich,
BY
Robert R. Lockwood
ATTY.

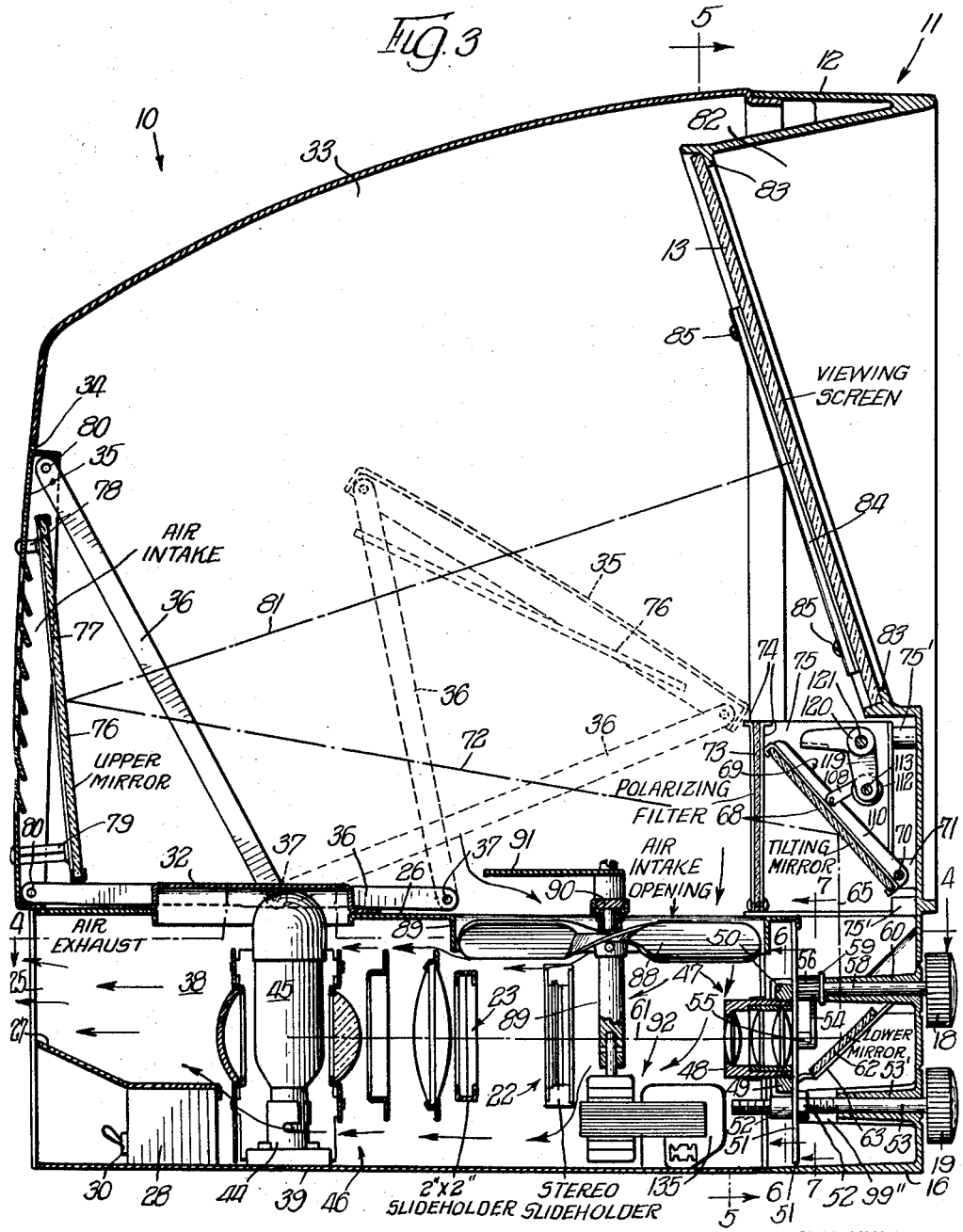

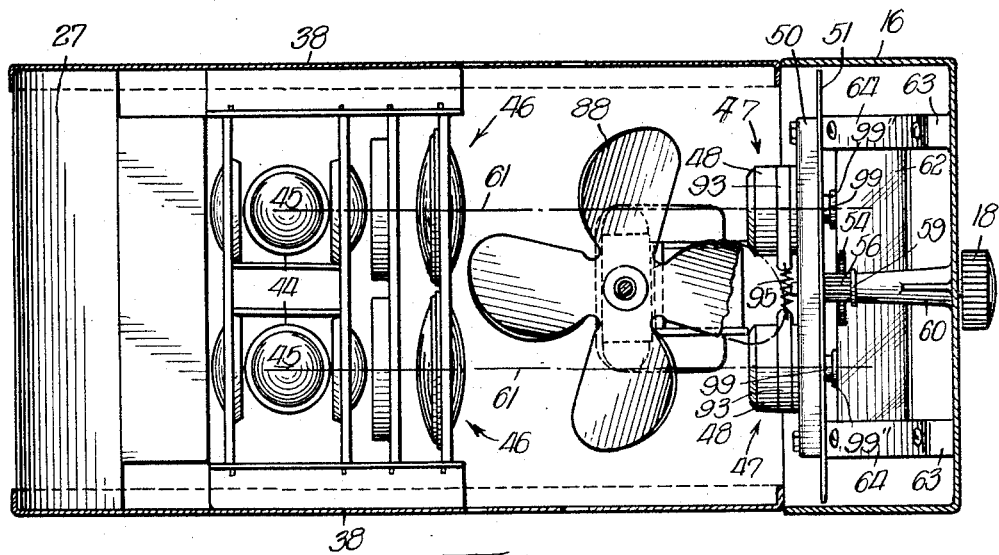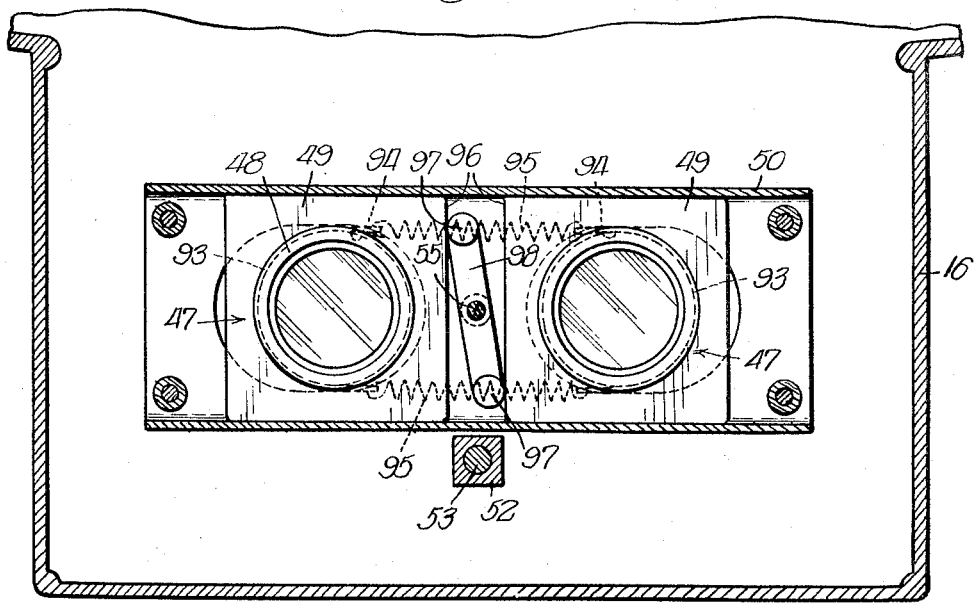

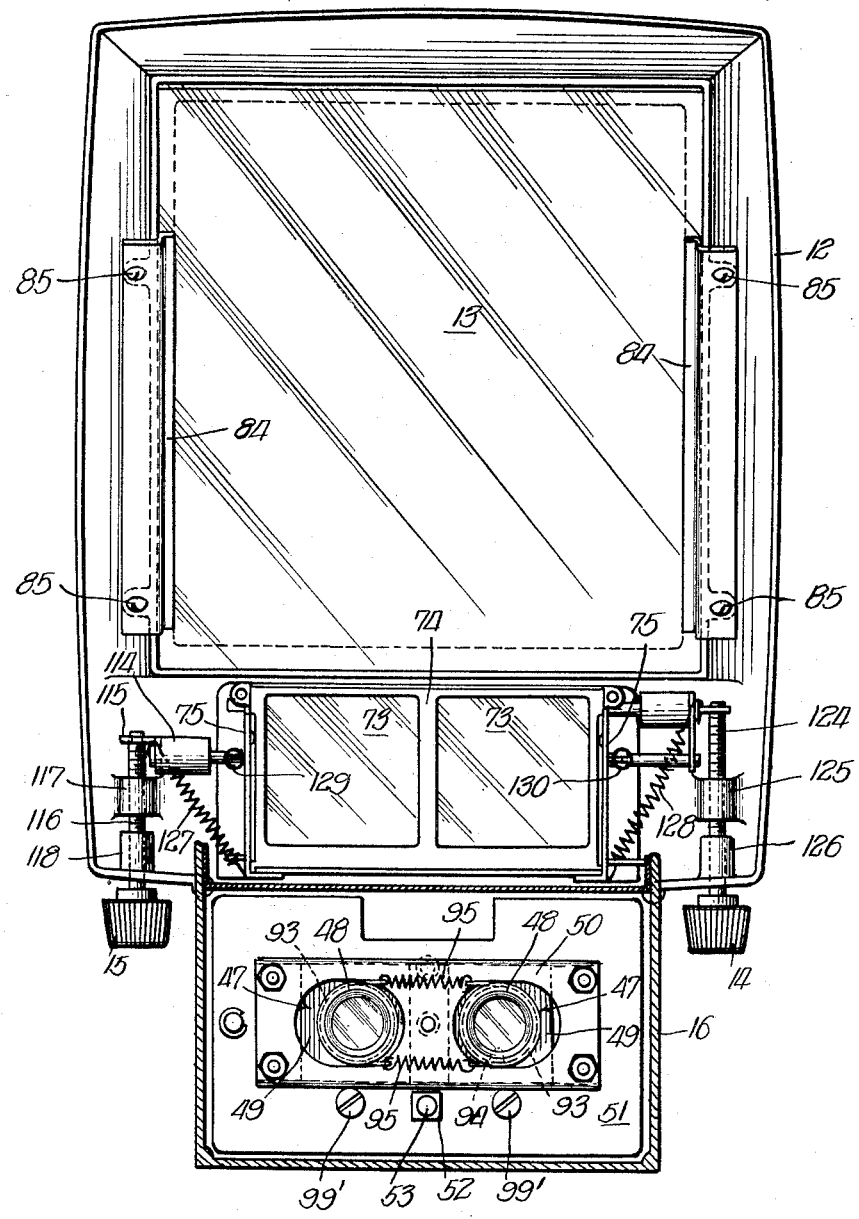

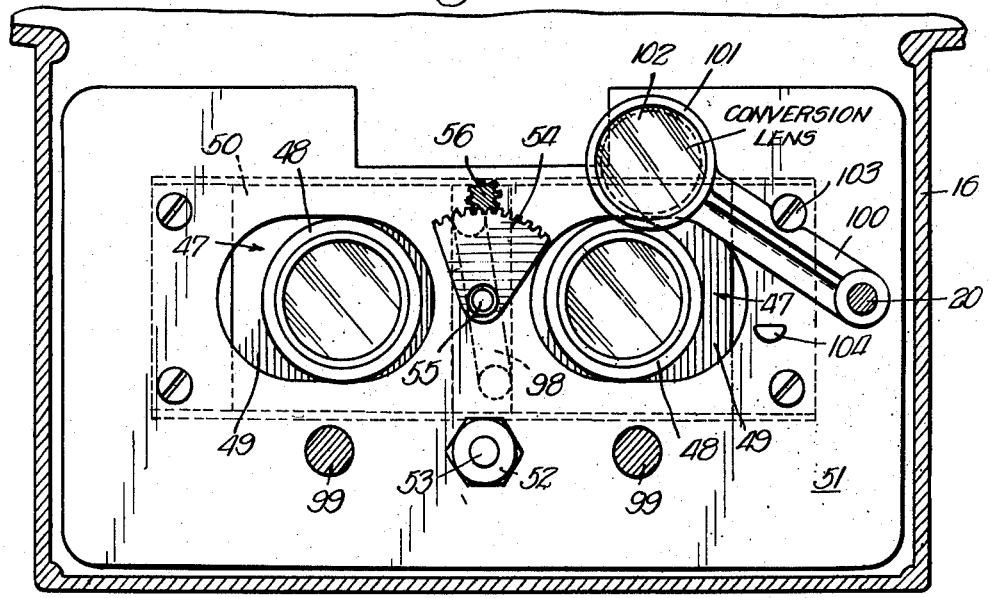
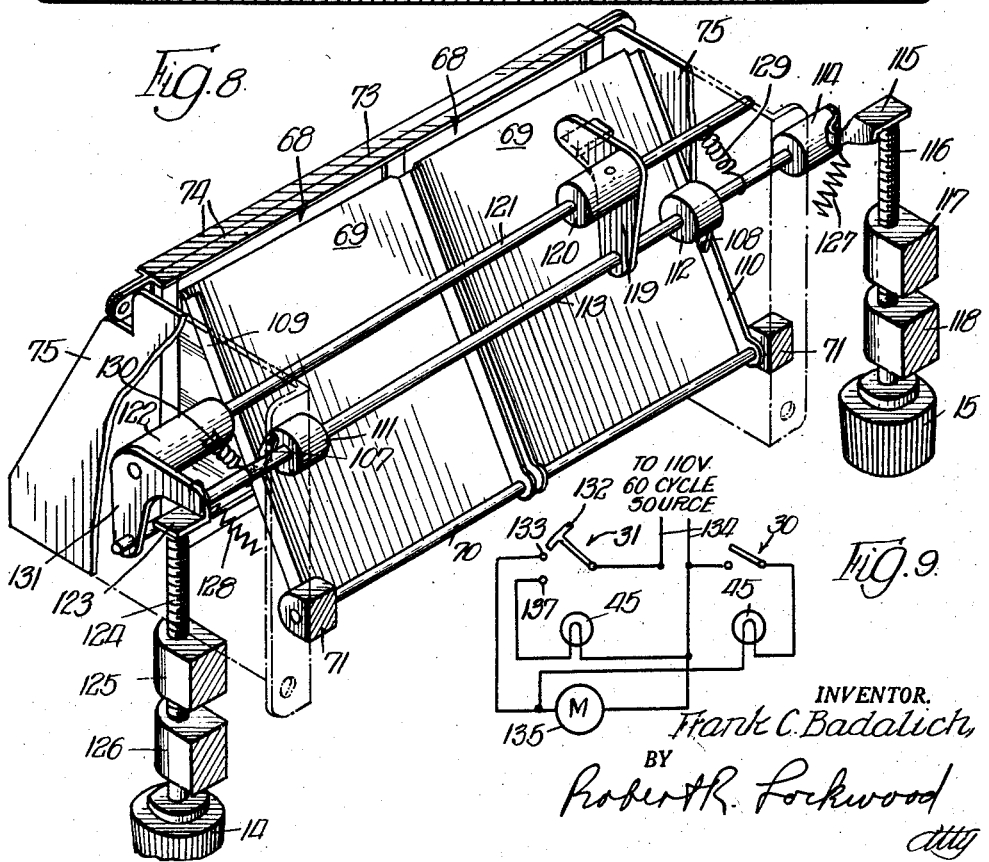

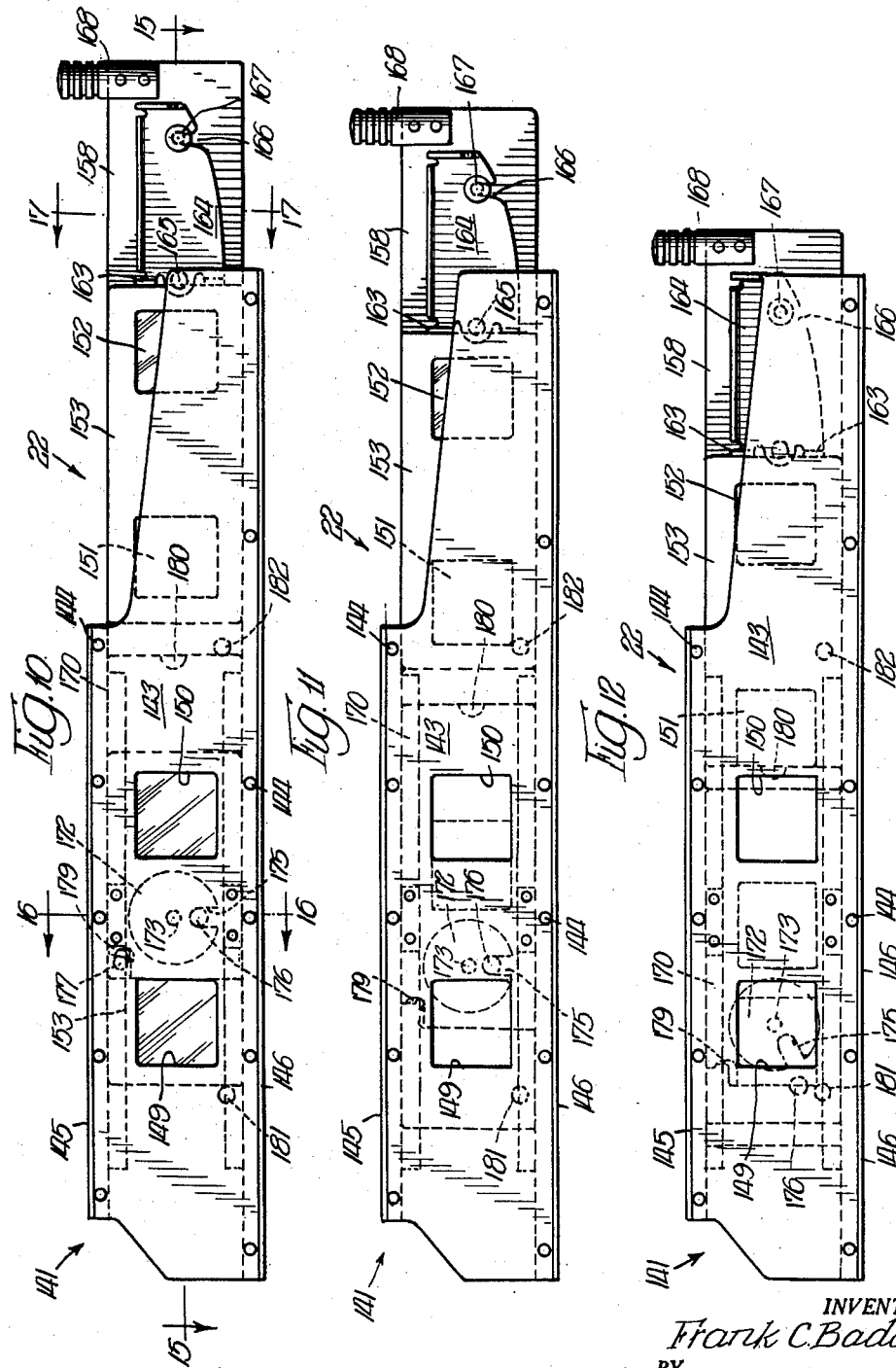

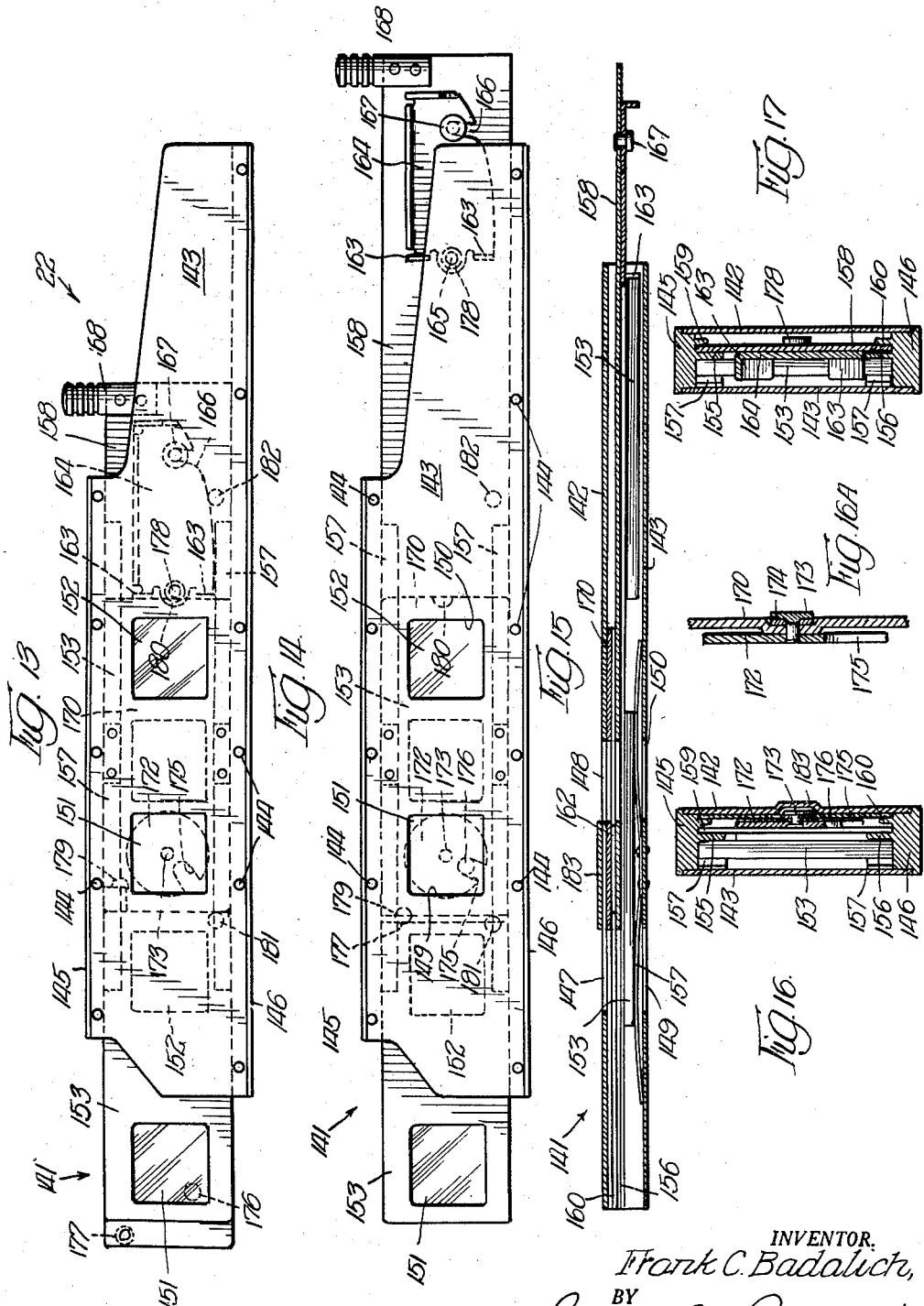

Dec. 1, 1959 F. C. BADALICH 2,914,985
SLIDE CHANGER AND SHUTTER FOR STEREOSCOPIC PROJECTORS
Original Filed Aug. 24, 1954 10 Sheets-Sheet 8

INVENTOR.
Frank C. Badalich,
BY
Robert R. Lockwood
Atty

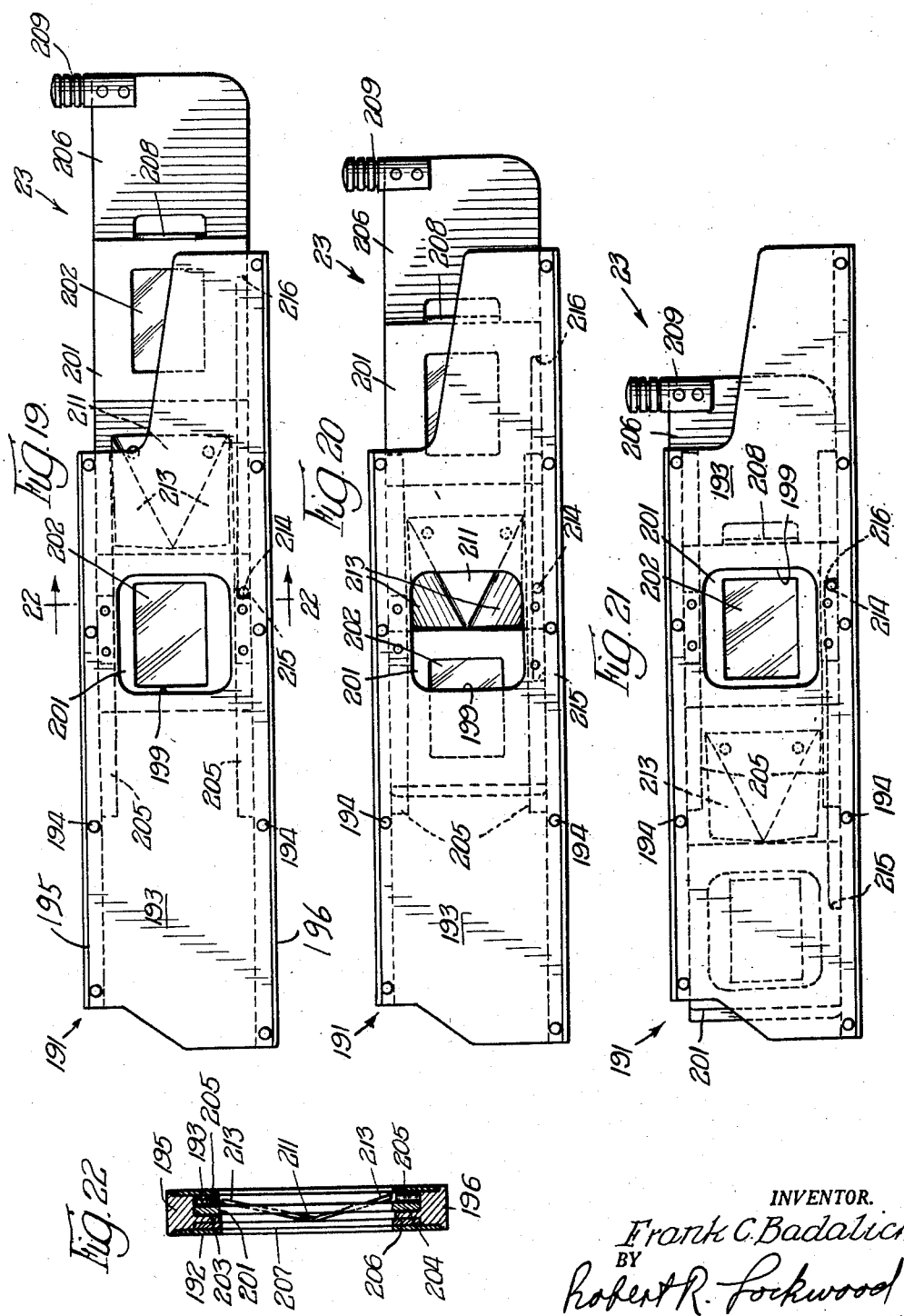

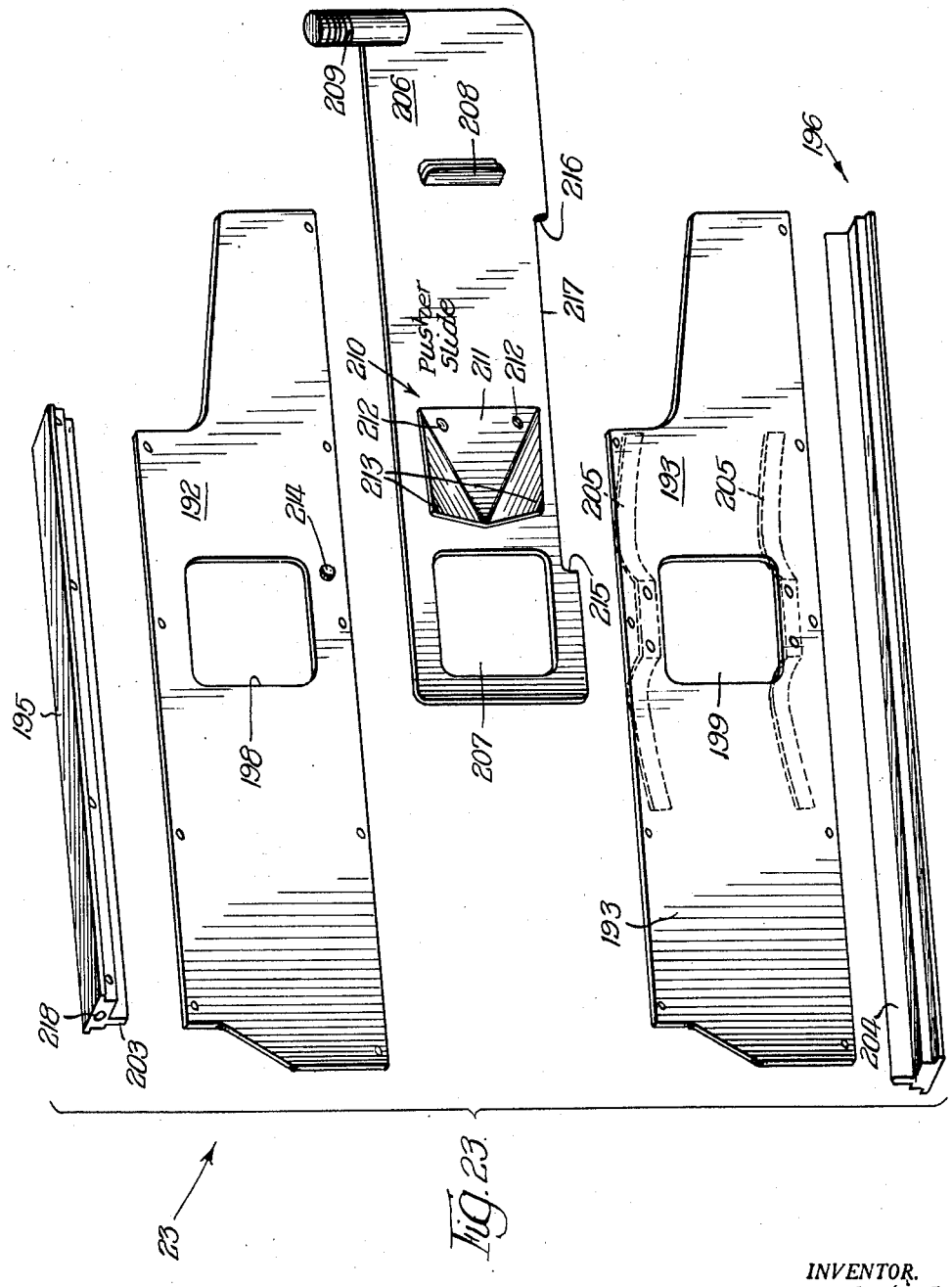

United States Patent Office 2,914,985
Patented Dec. 1, 1959

2,914,985

SLIDE CHANGER AND SHUTTER FOR STEREOSCOPIC PROJECTORS

Frank C. Badalich, Chicago, Ill., assignor to Bell & Howell Company, Chicago, Ill., a corporation of Illinois Original application August 24, 1954, Serial No. 451,849. Divided and this application May 3, 1955, Serial No. 505,773

3 Claims. (Cl. 88—28)

This invention relates, generally, to stereopticon projectors and it has particular relation to stereoscopic projecting and viewing devices. It constitutes an improvement over application Serial No. 323,861, filed December 3, 1952, now abandoned. This application is a division of application Serial No. 451,849, filed August 24, 1954, now abandoned.

Among the objects of this invention are: To transport slides into viewing position in the device and to hold them in such position; to open and close simultaneously the dual apertures employed in conjunction with the projection of objects on stereo slides; to eject the last stereo slide; and to insert and eject a slide by employing the same pusher slide.

Other objects of this invention will in part be obvious and in part appear hereinafter.

This invention is disclosed in the embodiment thereof shown in the accompanying drawings and it comprises the features of construction, combination of elements, and arrangement of parts which will be exemplified in the construction hereinafter set forth and the scope of the application of which will be indicated in the appended claims.

For a more complete understanding of the nature and scope of this invention reference can be had to the following detailed description, taken together with the accompanying drawings, in which:

Figure 1 is a perspective view looking generally from the front of slide projecting and viewing means constructed in accordance with this invention;

Figure 2 is a perspective view of the device shown in Figure 1, looking generally from the rear;

Figure 3 is a vertical sectional view of the slide projecting and viewing means shown in Figures 1 and 2;

Figure 4 is a horizontal sectional view taken generally along the line 4—4 of Figure 3;

Figure 5 is a vertical sectional view taken generally along the line 5—5 of Figure 3;

Figure 6 is a vertical sectional view taken generally along the line 6—6 of Figure 3;

Figure 7 is a vertical sectional view taken generally along the line 7—7 of Figure 3;

Figure 8 is a perspective view of the tilting mirrors and illustrates the operating mechanism therefor;

Figure 9 is a circuit diagram showing the connections which can be used for selectively energizing the two light sources and requiring that the motor driven fan be energized when either or both light sources are energized;

Figure 10 is a view in side elevation of a stereo slide changer, one slide being shown in viewing position with another slide ready to be moved into viewing position;

Figure 11 is a view similar to Figure 10 but showing the next slide being advanced into viewing position with the two apertures partly closed;

Figure 12 is a view similar to Figure 11 but showing the next slide further advanced and the apertures fully covered;

Figure 13 is a view similar to Figure 12 but showing the first slide fully ejected, the second slide in viewing position with the apertures still closed;

Figure 14 is a view similar to Figure 13 but showing the pusher slide withdrawn and the first slide in ejected position;

Figure 15 is a horizontal sectional view taken generally along the line 15—15 of Figure 10;

Figure 16 is a vertical sectional view taken generally along the line 16—16 of Figure 10;

Figure 16A is an enlarged cross sectional view through the cam on the auxiliary slide and showing the friction washer associated therewith;

Figure 17 is a vertical sectional view taken generally along the line 17—17 of Figure 10;

Figure 19 is a view in side elevation of a single slide changer for transporting single slides, for example 2" x 2" slides, this slide changer being arranged to be inserted in the slide projecting and viewing means shown in Figure 1 in lieu of the stereo slide changer and in a slightly different position;

Figure 20 is a view similar to Figure 19 but showing the first slide partially ejected from viewing position and the next slide being moved into viewing position;

Figure 21 is a view similar to Figure 20 but showing the first slide fully ejected and the next slide in viewing position;

Figure 22 is a vertical sectional view taken generally along the line 22—22 of Figure 19; and Figure 23 is an exploded perspective view of the single slide changer shown in Figures 19, 20 and 21.

Figure 18:
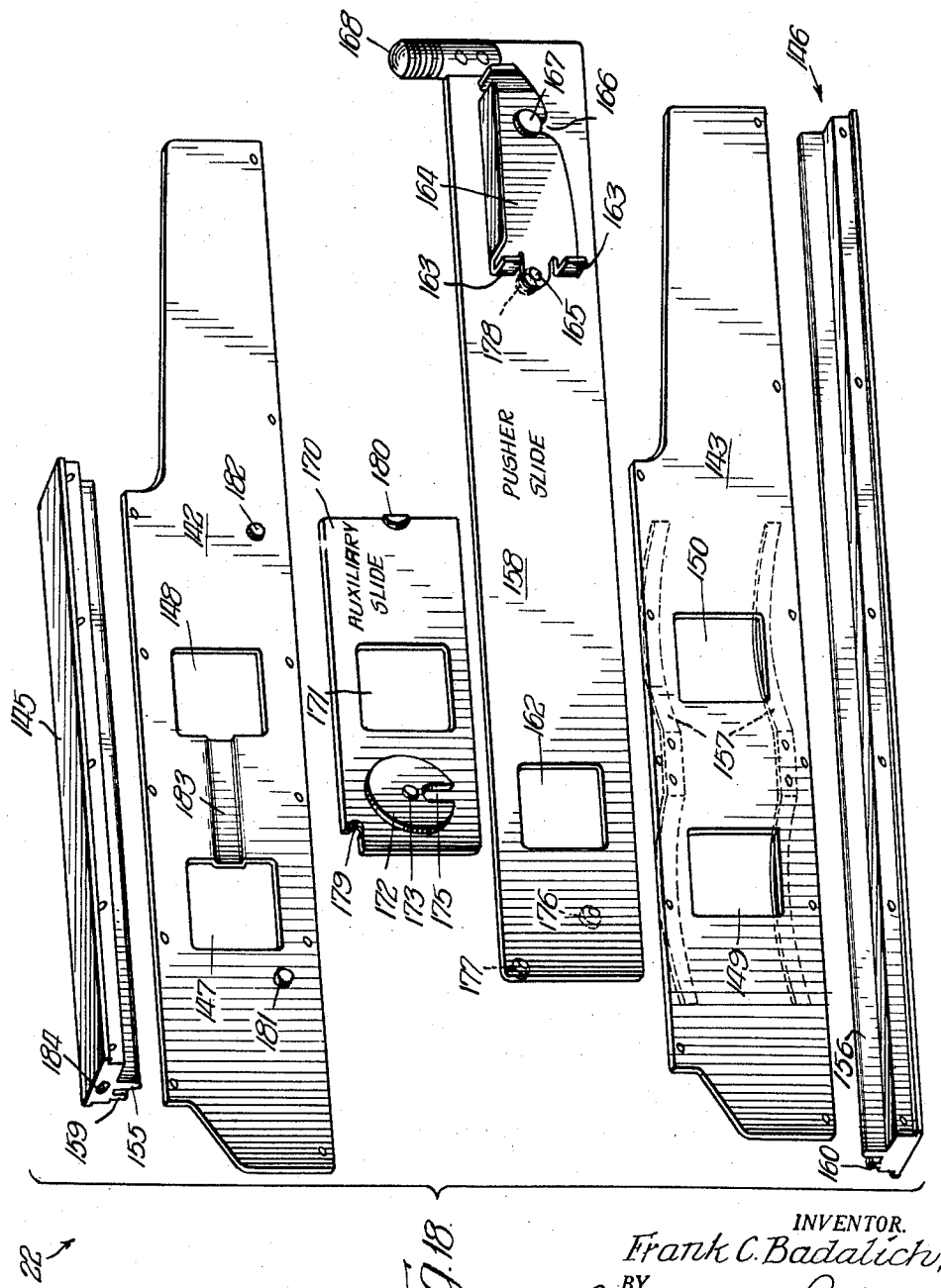
Figure 18 is an exploded perspective view of the stereo slide changer shown in Figures 10 to 17, inclusive.

Referring now particularly to Figures 1 and 2 of the drawings, it will be observed that the reference character 10 designates, generally, the stereo projecting and viewing device in which the present invention is embodied. The device 10 is intended for mounting on a table and it can be used, as will be described hereinafter, for viewing stereo slides on a screen mounted on the device or for viewing the slides on a remotely positioned screen. Also, the device 10 can be employed for viewing single slides on the screen provided thereon or on a remotely positioned screen.

The device 10 includes a front frame, shown generally at 11, which comprises an upper portion 12 on which a viewing screen 13 is mounted. At the lower left-hand side of the upper portion 12 there is a tilt control knob 14, and at the lower right-hand corner there is a vertical adjustment knob 15. It will be described hereinafter how these knobs operate the tilting mirrors to adjust the images on the screen 13 or on the remote screen relative to each other and the vertical positions thereof.

The front frame 11 includes an integral lower portion 16 provided with feet 17, which may be rubber bushings, for mounting on a table top. Mounted on the lower portion 16 is a picture separation knob 18 and a focus adjustment knob 19. These knobs are employed, as will be described hereinafter, for shifting the interocular positions of the projecting lens systems and for jointly moving them to obtain the proper focus. A changeover knob 20 in the form of a shaft projecting through the front wall of the lower portion 16 is employed, as will be set forth hereinafter, for shifting the position of a conversion lens to adapt one of the optical systems for use in conjunction with single slide projection.

Extending rearwardly from the lower portion 16 of the front frame 11 is a rectangular channel frame shown generally at 21. This channel frame 21 is made up of plates, to be described hereinafter, and constitutes a conduit through which cooling air can be directed.

Extending transversely of the rectangular channel frame 21 is a stereo slide changer that is indicated generally at 22. To the rear of the stereo slide changer 22 there is a single slide changer, shown generally at 23, which is employed for transporting single slides, such as 2" x 2" slides. It will be understood that only one of the slide changers 22 or 23 will be used at any one time. Both are shown in Figure 1 in order to illustrate their positions in the stereo projecting and viewing device 10. As shown in Figure 2, feet 24, like the feet 17, are provided at the rear end of the channel frame 21 for mounting the device 10 on a table top.

Figure 2 shows the air exhaust 25 at the rear upper portion of the rectangular channel frame 21. This exhaust opening is defined, in part, by a top plate 26 which overlies the top of the channel frame 21 and a baffle plate 27 which extends transversely of the channel frame 21 and intermediate the rear end thereof. Underneath the baffle plate 27 is a control panel 28 which carries prongs 29 for connection to a suitable jack that is arranged to be connected to a current source, such as a 110 volt 60 cycle source. Also mounted on the control panel 28 is a two position switch 30 for controlling the energization for one of the light sources for one of the optical systems and a three position switch 31 for controlling the energization of the motor which operates the fan to cool the optical systems. A lamp cover 32, secured by thumb screws 32', is mounted on the top plate 26 as shown. When the lamp cover 32 is removed, it is possible to remove the light sources for changing or replacing them.

Extending rearwardly from the upper portion 12 of the front frame 11 and enclosing the space above the channel frame 21 is a housing 33. Preferably the housing 33 is formed of two pieces of molded plastic and is secured by suitable means to the upper portion 12 and to the channel frame 21. At the rear of the housing 33 there is an opening 34 through which the optical axes extend when the object or objects on the slides are to be viewed on a remotely positioned screen. The opening 34 is closed by a louvered closure 35 which is supported by two pairs of crossed links 36 which are pivoted at their lower ends at 37 onto the sides of the channel frame 21. The louvered closure 35 provides for the intake of cool air into the housing 33 when the fan is operated, as will be described.

The channel frame 21 is formed, as indicated, by the top plate 26 and by a pair of side plates 38 and bottom plate 39. These plates are rigidly secured together to provide the rectangular channel frame 21 in which portions of the optical systems are mounted.

Referring now particularly to Figure 3 of the drawings, it will be noted that one of the optical systems is here shown in detail. Since the two optical systems used for viewing or projecting objects on stereo slides are identical, the same reference characters will be applied to corresponding elements in both systems. Figure 4 shows the relationship between the two optical systems, it being understood that they are spaced apart the same distance that the eyes of the average adult are spaced apart.

In Figure 3 there is shown at 44 one of the two sockets, mounted on the bottom plate 39, for carrying a light source or lamp 45. Preferably the lamp 45 is of relatively high wattage. For example, it may be a 300 watt lamp with a concentrated filament. Associated with each lamp 45 is a condensing lens system, shown generally at 46, and suitably mounted between the side plates 38 of the channel frame 21. Associated with each condensing lens system 46 is a projection lens system, shown generally at 47. Each projection lens system includes a lens barrel 48 which is threaded into a block 49 that is slidable horizontally in a channel 50 that is mounted on and movable with a plate 51. As will be set forth hereinafter, the blocks 49 can be moved laterally toward and away from each other for the purpose of adjusting the interocular distance between the projection lens systems 47.

In order to adjust the focus of the optical systems, provision is made for moving the plate 51 longitudinally of the channel frame 21 or toward and away from the condensing lens systems 46. For this purpose a nut 52 is secured to the plate 51 and a threaded shaft 53 is screwed into it. As shown, the shaft 53, which is rotatably mounted in a sleeve 53' formed integrally with the lower portion 16, carries the focus adjustment knob 19 at its outer end. It will be understood that the plate 51 and the projection lens systems 47 mounted thereon will be moved in one direction or another, depending upon the direction in which the knob 19 and the shaft 53 are rotated.

The interocular distance between the projection lens systems 47 is adjusted by a gear sector 54 which is mounted on a shaft 55. The connection between the shaft 55 and the blocks 49 carrying the projection lens systems 47 will be described hereinafter. At this time it is pointed out that the gear sector 54 engages a long pinion 56 that is fast on a shaft 58. A friction washer 59 interposed between the pinion 56 and the inner end of a sleeve 60, integral with the lower portion 16, serves to hold the pinion 56 and shaft 58 in any position to which they may be rotated. At the front end of the shaft 58 the picture separator knob 18 is mounted. Thus when the knob 18 is rotated in one direction or the other, the shaft 58 and pinion 56 are rotated and a corresponding movement of the gear sector 54 takes place.

The optical axis through the condensing lens system 46 and the projection lens system 47 is indicated by the broken line 61. In Figure 4, both optical axes are shown. In order to reduce the size of the stereo projecting and viewing device 10 to a minimum, provision is made for redirecting the optical axis 61 by means of mirrors. For this purpose a lower inclined mirror 62 is mounted on a support 63 which is integral with the lower portion 16 of the front frame 11. Clamp plates 64, Figure 4, serve to hold the lower mirror 62 in position on the support 63. The lower mirror 62 is inclined to the horizontal at an angle of 45 degrees so that the optical axis 61 is redirected as indicated by the broken line 65 vertically upwardly. In this manner the light rays from the light source 45 are shifted through an angle of 90 degrees.

In keeping with the redirection of the optical axis for each optical system, a pair of tilting mirrors 68 is positioned directly above the lower mirror 62. The tilting mirrors 68 are mounted on frames 69 which are rockably mounted about their lower edges on a common shaft 70 which is carried by bosses 71 that are integral with the front frame 11. The manner in which the mirrors 68 are commonly tilted about the shaft 70 and are tilted in opposite directions in respect to each other will be set forth hereinafter. For present purposes, it is pointed out that the optical axis is redirected by the tilting mirrors 68, as indicated by the broken line 72, through a polarizing filter 73 which is carried by frames 74 extending transversely between end brackets 75 that are mounted on bosses 75' formed integrally with the front frame 11. The brackets 75 close off the space between the mirrors 68 and the polarizing filter 73 and thereby prevent dust from collecting on the mirrors and the inside of the filter 73.

The optical axis, as indicated by the broken line 72, is again redirected by an upper mirror 76 which is mounted on a frame 77 that is carried by spacers 78 and 79 extending inwardly from the inside of the louvered closure 35. The other ends of the crossed links 36 are pivoted at 80 to the louvered closure 35. It will be apparent that the louvered closure 35 carrying the upper mirror 76 can be swung to the alternate position shown by broken lines in Figure 3. In this position, the weight of the louvered closure 35 and the mirror 76 is sufficient to hold them in the alternate position, which is an over center position, and thus it is unnecessary to employ springs or other equivalent means for holding them in this position. It will be observed that when the upper mirror 76 is swung to the alternate position, the optical axis 72 extends through the opening 34 at the rear of the housing 33 and thus the objects can be projected on a screen positioned remotely from the stereo projecting and viewing device 10.

The upper mirror 76 redirects the optical axis, as indicated by the broken line 81, onto the viewing screen 13 which is positioned in a recessed opening 82 in the upper portion 12 of the front frame 11. The viewing screen 13 is held in position against a flange 83, formed integrally with the upper portion 12, by holding strips 84 which are secured in position by screws 85, Figure 5. It will be observed that the principal parts of the two optical systems are mounted on the front frame 11. As just described, the viewing screen 13 is mounted on the upper portion 12 of the frame 11. The two projection lens systems 47 are carried by the plate 51 which is movably mounted on the lower portion 16 of the frame 11. It will be recalled that the lower mirror 62 is mounted on the support 63 which is integral with the lower portion 16. The tilting mirrors 68 are mounted on the shaft 70 which is carried by the lower portion of the upper portion 12. Thus all of these important parts of the two optical systems are mounted on the single front frame 11 which can be carefully cast and machined with a high degree of accuracy. By mounting all of these important parts of the optical systems on the single frame, it is possible to maintain them in the necessary alignment for optimum viewing conditions.

In view of the use of the high wattage light sources or lamps 45, it is highly desirable that the heat generated thereby be rapidly removed in order to prevent injury to the polarizing filter 73, projection lens systems 47, the stereo slides carried by the slide changer 22 or the single slides carried by the slide changer 23, and the condensing lens systems 46, as well as the lamps 45 themselves.

In order to remove the heat generated by the lamps 45 and to maintain the important parts of the optical systems at temperatures well below damaging temperatures, a fan 88 is employed. It is positioned within a thimble 89 that is formed integrally with the top plate 26 of the channel frame 21. The fan 88 is positioned between the condensing lens systems 46 and the projection lens systems 47, with the slide changers 22 and 23 being positioned between the fan 88 and the condensing lens systems 46. In this position of the fan 88, the coolest air is drawn past the polarizing filter 73, projection lens systems 47, and the slides in the slide changer 22 or 23, as the case may be.

The fan 88 is rotatably mounted in a cross bracket 90 that is carried by the top plate 26 and extends across the thimble 89. A deflector plate 91, mounted on the bracket 90, insures that a major portion of the cool air will be drawn past the polarizing filter 73. The fan 88 rotates in a horizontal plane and is driven by a motor, shown generally at 92, which is mounted on the bottom plate 39 of the channel frame 21.

In Figure 3 of the drawings, arrows have been placed thereon to show the direction of the flow of cooling air. It will be observed that the cooling air enters through the openings in the louvered closure 35 and flows around and underneath the upper mirror 76 into the space enclosed by the housing 33. Some of the air flows underneath the deflector plate 91, while the major portion of it flows past the polarizing filter 73 through the air intake opening formed by the fan thimble 89. As shown by the arrows, the air flows past the projection lens systems 47 and over the motor 92. It also flows past the slide changers 22 and 23 with the slides therein (depending upon which is used) around the condensing lens systems 46 and the lamps 45, whence it is discharged through the air exhaust 25. It will be noted that the rectangular channel frame 21, formed by the top plate 26, side plates 38 and bottom plate 39, provides a conduit or channel through which the cooling air drawn downwardly through the air intake opening in the fan thimble 89 can flow over the essential parts of the device 10 which are likely to be damaged if subjected to excessive heat. In this manner, the cool air is drawn in from a location above the position where the hot air is exhausted. As a result, a minimum of dust is circuated through the housing 33. The brackets 75 closing off the space between the tilting mirrors 68 and the polarizing filter 73 prevent the circulation of air therebetween, and the combination encloses the space above the lower mirror 62 so that air is not circulated thereover. Thus, a minimum of dust is likely to collect on the inner surface of the polarizing filter 73, the surfaces of the mirrors 62 and 68, and the surface of the outermost lens of the projection lens systems 47.

Referring now particularly to Figures 4, 5 and 6 of the drawings, the manner in which the projection lens systems 47 are adjusted for changing the interocular distance is illustrated. It will be observed that a U-shaped yoke 93 partially surrounds each lens barrel 48 and is located in a peripheral groove 94 in each. The ends of the yokes 93 extend toward each other and they are interconnected by coil tension springs 95. Thus, the lens barrels 48 are normally biased toward each other. As shown more clearly in Figure 6, the adjacent sides 96 of the blocks 49 carrying the lens barrels 48 are parallel to each other and they are arranged to be engaged by rollers 97 located at the ends of an arm 98 which is centrally mounted on the shaft 55 on which the gear sector 54, Figure 3, also is mounted. When the shaft 55 is rocked in one direction or the other, the arm 98 is correspondingly rocked. For example, considering Figure 6, when the shaft 55 is rocked in a counter-clockwise direction, the rollers 97 are moved in opposite directions in engagement with the respective parallel sides 96 of the blocks 49. The blocks 49 then are moved away from each other and the springs 95 are further tensioned. The friction washer 59 cooperating with the pinion 56 and the sleeve 60 serves to hold the lens barrels 48 against the biasing force of the springs 95 in any position to which they may be operated.

It will be recalled that the plate 51 carrying the projection lens systems 47 is movable along the lower portion 16 of the frame 11 by rotation of the focus adjustment knob 19. This is effected by the engagement of the threaded shaft 53 with the nut 52 that is carried by the plate 51. It is desirable that the plate 51 be accurately guided in this movement. For this purpose, guide pins 99, Figure 7, are secured to the plate 51 by screws 99', Figure 5. These two guide pins 99 have a close sliding fit with guide sleeves 99", one of which is shown in Figure 3. The guide sleeves 99" are cast integrally with the lower portion 16 of the front frame 11. In this manner, the projection lens systems 47 are mounted on the single frame 11 which, as pointed out, can be cast and machined with a high degree of accuracy.

It was pointed out in connection with Figure 1 of the drawings that the single slide changer 23 is positioned to the rear of the stereo slide changer 22. This relationship is shown more clearly in Figure 3 of the drawings. It will be understood that, when the single slide changer 23 is employed, only one of the optical systems is required to be energized. The optical system employed is the one shown in Figure 3 for viewing single slides. However, it is necessary to modify the optical system so as to adapt it for projection of the single slide transported into the optical system by the slide changer 23 in order to take care of its different location in the optical system and to accommodate transparencies having a larger area than do the transparencies used for stereo slides. It will be recalled that the changeover knob 20, Figure 3, is provided for this purpose. As shown in Figure 7, the changeover knob 20 is shown as extending into the lower portion 16. As a matter of fact, the knob 16 is a shaft which is suitably journaled on the plate 51. It carries an arm 100 having at its outer end a lens holder 101 in which a conversion lens 102 is mounted. As shown in Figure 7, the conversion lens 102 is swung to the inoperative position against a stop 103. It can be swung by rotation of the knob 20 to operative position against a stop 104, carried by the plate 51, where it is positioned in front of the associated projection lens system 47 and along the optical axis 61 between it and the lower mirror 62.

It is desirable to be able to shift the relative positions of the images along the optical axes as they appear on the viewing screen 13 or as they appear on the remotely positioned screen in order to bring the stereo images into proper relative positions. In addition, as pointed out hereinbefore, it is desirable to shift both images vertically so as to position them properly on the viewing screen 13 or on the remotely positioned screen. The knobs 14 and 15 are provided on the lower part of the upper portion 12 of the frame 11 for this purpose. The mechanisms which these knobs control are shown more clearly in Figure 8 of the drawings, which is a perspective view looking down on the mechanisms with the viewing screen 13 removed.

It will be recalled that the mirrors 68 are mounted on frames 69 which are individually pivotally mounted on a shaft 70 that is carried by bosses 71 formed integrally with the front frame 11. In order to individually shift the frames 69 and the mirrors 68 carried thereby relative to each other, links 107 and 108 are employed. One end of each of these links is connected, respectively, to flanges 109 and 110 of the frames 69, while the other ends of these links are connected to crank arms 111 and 112 which are fast on the shaft 113. The crank arms 111 and 112 are in the form of cylindrical members, and the link 107 is connected to the arm 111 on one side of the shaft 113 while the link 108 is connected to the arm 112 on the opposite side of the shaft 113. Thus, as the shaft 113 is rocked in a counterclockwise direction, for example, the frame 69 and the mirror 68 carried thereby with which the link 107 is associated moves rearwardly or toward the polarizing filter 73, while the other frame 69 and its mirror 68 move away therefrom. The shaft 113 is carried by the end brackets 75 and is bodily movable thereon to a limited extent.

Provision is made for rocking the shaft 113 by mounting at one end a sleeve 114 from which an arm 115 projects. An adjusting screw 116 is threaded in a boss 117 that is cast integrally with the front frame 11. It extends through a guide boss 118 also cast integrally with the frame 11. At its lower end the adjusting screw 116 carries the vertical adjustment knob 15.

In order to move the mirrors 68 and the frames 69 carrying the same jointly, provision is made for bodily moving the shaft 113. It will be recalled that it is mounted for such movement in the end brackets 75, and for this purpose suitable slots are provided therein. As shown in Figure 8, provision is made for bodily moving the shaft 113 by a bracket arm 119 which is carried by a sleeve 120 that is fast on a shaft 121 which extends through the end brackets 75 and is rotatable thereon. At one end of the shaft 121 there is fastened a sleeve 122 from which an arm 123 projects. As shown in Figure 8, the arm 123 is engaged by an adjusting screw 124 which is threaded in a boss 125 that is cast integrally with the front frame 11. The lower portion of the adjusting screw 124 extends through a guide boss 126, also cast integrally with the front frame 11, and at its lowermost end it carries the tilt control knob 14.

In order to maintain the arms 115 and 123 in engagement with the upper ends of the respective adjusting screws 116 and 124, coil tension springs 127 and 128, respectively, Figures 5 and 8, are employed. One end of each of these springs is hooked over the respective arms 115 and 123, while the other ends are anchored to the lower portions of the end brackets 75. Coil tension springs 129 and 130 are anchored at one end to the end brackets 75 and are connected at their other ends to the shaft 113 for biasing it toward the polarizing filter 73. As shown in Figure 8, the arm 123 has a depending portion 131 which supports the adjacent end of the shaft 113 and causes it to move along with the bracket arm 119 when the shaft 121 is rocked by the tilt control knob 14.

The circuit connections for controlling the energization of the lamps 45 and the motor 92 are shown in Figure 9 of the drawings. It will be observed that the three position switch 31 carries a bridging contact 132 that first engages a contact 133. This completes a circuit from energized conductors 134 to the operating winding 135 of the motor 92. In addition, a circuit is prepared for energizing the lamp 45 shown to the right of this figure when the two position switch 30 is operated to the closed position. Thus it is always necessary to operate the switch 31 to engage contact 133 and energize the winding 135 of the motor 92 to rotate the fan 88 before the lamp 45 associated with the switch 30 can be energized. It will be understood that only one lamp 45 is required to be energized when single slides are being shown. When stereo slides are shown, the switch 31 is shifted so that the bridging contact 132 not only engages contact 133 but also a contact 137. Then the other lamp 45 is energized and the operating winding 135 of the motor 92 continues to be energized.

In Figures 10 to 18, inclusive, are shown the details of construction of a preferred form of stereo slide changer 22. In general, the stereo slide changer 22 is constructed in such manner as to quietly and efficiently transport stereo slides into and out of viewing position across the optical axes 61. In viewing position, the transparencies of the stereo slide register with the respective optical systems so that the objects on the transparencies are individually projected along the two optical axes and reflected in the manner previously described until they are thrown onto the viewing screen 13 or onto the remotely positioned screen. Provision is made for closing off the apertures in the slide changer 22 before any movement of the stereo slide in registry therewith takes place. Likewise, provision is made for moving the next slide into viewing position before the apertures are opened. In addition, provision is made for simultaneously opening and closing both apertures, all to the end that the stereo view appearing on the screen 13 or on the remotely positioned screen will appear as naturally as is possible and with a maximum of ease to the viewer.

The stereo slide changer 22, in general, comprises a housing which is indicated generally at 141 in Figures 10 to 14, inclusive, of the drawings. Figure 18 shows the parts making up the elongated housing 141. It comprises a back plate 142 and a front plate 143 of the same general shape and formed preferably of stainless steel. The front and back plates 142 and 143 are secured by rivets 144 to opposite sides of a top track 145 and a bottom track 146 that preferably are formed of aluminum. The upper and lower edges of the plates 142 and 143 are located, as shown in Figures 16 and 17, in longitudinal recesses extending along the sides of the tracks 145 and 146. Rectangular openings 147 and 148 are provided in the back plate 142, and similar rectangular openings 149 and 150 are provided in the front plate 143. These openings are in registry with each other in the respective plates and they are located symmetrically in respect to the optical axes 61, as will be readily understood. Transparencies 151 and 152, Figure 10, in a stereo slide 153 are arranged to be moved into registry with the rectangular openings 147—149 and 148—150, respectively, so that the objects thereon can be viewed on the screen 13 or projected onto the remotely positioned screen, as the case may be.

Referring again to Figure 18 of the drawings, it will be noted that ribs 155 and 156 are provided on the tracks 145 and 146, respectively. The stereo slide 153 is guided for movement between these ribs 155 and 156 and the front plate 143. Bow springs 157 bias the slide into engagement with the ribs 155 and 156 and thus, regardless of the thickness of the slide, within limits, the transparencies 151 and 152 are always located in the same positions relative to the optical axes 61. Thus it is unnecessary to change the focus of the projection lens sytsem 47 once it has been set.

The stereo slide 153 is transported to the viewing position by a pusher slide 158 which preferably is formed of stainless steel. The pusher slide 158 is guided in the elongated housing 41 between the ribs 155 and 156 on the tracks 145 and 146, respectively, and ribs 159 and 160, respectively, on these tracks. A single rectangular opening 162 is provided in the pusher slide 158 and it is arranged to register with the rectangular openings 148 and 150 in the back and front plates 142 and 143, respectively, when the pusher slide 158 is fully withdrawn to the position shown in Figure 10.

The stereo slide 153 is transported into the viewing position, as shown in Figure 10, by engagement at one end with arms 163 that are formed integrally with a last slide ejector 164 which is pivoted at 165 on the pusher slide 158. The ejector 164 has a slot 166 on its underside which interfits with a rivet 167 and serves to hold it in the position shown in Figure 10 for transporting the slides 153 successively into the viewing position. When the last slide is to be ejected, the ejector 164 is swung from the position shown in Figure 10 through 180 degrees where the opposite end is so located as to engage the slide in viewing position and move it to the ejected position when the pusher slide 158 is moved to the ejecting position shown in Figure 13. A handle 168 is fastened to the right-hand end of the pusher slide 158 to facilitate movement thereof.

With a view to insuring that the apertures in the back and front plates 142 and 143 will always be covered by a slide or by opaque shutter means and to make certain that these apertures are simultaneously closed and opened, an auxiliary slide 170 is employed. Preferably it is formed of stainless steel. It has a rectangular opening 171 which is arranged to register with the openings 148 and 150 in the back and front plates 142 and 143 when the stereo slide 153 is in the viewing position. In order to effect the movement of the auxiliary slide 170 on movement of the pusher slide 158 and yet permit independent movement thereof, a cam 172 is rotatably mounted on a rivet 173 which extends through the slide 170. As shown more clearly in Figure 16A of the drawings, a friction washer 174 is interposed between the head of the rivet 173 and the adjacent surface of the auxiliary slide 170 for the purpose of providing a slight friction drag on the rotation of the cam 172 with respect to the auxiliary slide 170. Movement of the cam 172 and movement of the auxiliary slide 170 is provided by a U-shaped slot 175 extending radially outwardly in the cam 170 and a detent 176 that is carried by the pusher slide 158. The movement of the auxiliary slide 170 is also effected by detents 177 and 178 that are carried by the pusher slide 158 near the respective ends thereof. The detent 177 is arranged to engage a raised portion 179 on the auxiliary slide 170, while the detent 178 is arranged to engage a raised portion 180 at the other end of the auxiliary slide 170. The movement of the auxiliary slide 170 is limited by detents 181 and 182 which project from the front side of the back plate 142. The auxiliary slide 170, as shown in Figure 16 of the drawings, slides in the groove that is formed between the ribs 159 and 160 on the tracks 145 and 146 and the back plate 142. The back plate 142 is provided with a groove 183 for accommodating the head of the rivet 173. A threaded opening 184 is provided in the left-hand end of the top track 145, Figure 18, for receiving a holding stud that projects through the right-hand side plate 38, as shown in Figure 2, for holding the stereo slide changer 22 in operative position in the rectangular channel frame 21.

Figure 10 of the drawings shows a stereo slide in viewing position and another stereo slide 153 in position to be transported into viewing position, the first slide to be ejected by movement of the pusher slide 158 to the left. In this position of the pusher slide 158, the detent 176 engages the slot 175 in the cam 172. The auxiliary slide 170 is in the retracted position where it engages the detent 182, and in this position the detent 177 on the pusher slide 158 engages the raised portion 179 on the auxiliary slide 170, thereby limiting the extent that the pusher slide 158 can be withdrawn from the elongated housing 141.

When the pusher slide 158 is moved to the left, it carries with it the auxiliary slide 170 because of the friction provided by the friction washer 174 between the rivet 173 and the auxiliary slide 170. Thus, as shown in Figure 11 of the drawings, the cam 172 has not moved relative to the auxiliary slide 170, while the latter has moved away from the detent 182. At the same time, the next slide 153 has been moved toward the viewing position. This movement of the auxiliary slide 170 partially closes the apertures 147—149 and 148—150.

Continued movement of the pusher slide 158 to the left causes the next slide 153 to engage the first slide and, as shown in Figure 12, to move it out of the viewing position. However, the first slide is not engaged by the next slide until the auxiliary slide 170 has completely closed the apertures 147—149 and 148—150. When the auxiliary slide 170 has closed these apertures, its left-hand end engages the detent 181 and further movement thereof is prevented. However, continued movement of the pusher slide 158 is permitted since the cam 172 can rotate to the position shown in Figure 12 against the friction force created by the friction washer 174. The detent 176 then moves out of the U-shaped slot 175 in the cam 172. This further movement of the pusher slide 158 is necessary in order to completely eject the first slide 153 and to transport the next slide 153 into viewing position. In the viewing position, the next slide 153 is held by the bow springs 157, as shown more clearly in Figure 15.

Figure 13 shows the pusher slide in the position where the first slide is fully ejected and the next slide is in viewing position. The movement of the pusher slide 158 in the ejecting direction is limited by engagement of the detent 178 with the raised portion 180 on the auxiliary slide 170. Since the auxiliary slide 170 is held against further movement by the detent 181, further movement of the pusher slide 158 to the left is prevented.

Next, the pusher slide 158 is moved to the right, as shown in Figure 14, for the purpose of uncovering the apertures 147—149 and 148—150. In this movement of the pusher slide 158, the detent 176 again enters the U-shaped slot 175. Because of the friction between the rivet 173 and the friction washer 174, the cam 172 is not rotated and the auxiliary slide 170 is bodily moved to uncover both of the apertures 147—149 and 148—150 simultaneously. When the auxiliary slide 170 engages the detent 182, further movement thereof is prevented, while the pusher slide 158 is permitted to move still further and the cam 172 is rotated by the detent 176 during this final movement of the pusher slide 158. As previously described, this movement of the pusher slide 158 is arrested when the detent 177 engages the raised portion 179 on the auxiliary slide 170.

The ejected slide 153 is removed and another slide is inserted ahead of the arms 163. The foregoing described sequence of operations is repeated as long as desired.

In Figures 19 to 23, inclusive, of the drawings the construction of the single slide changer 23 is illustrated. As pointed out hereinbefore, this slide changer is employed in lieu of the stereo slide changer 22 when it is desired to show single slides. Only a single optical system is employed for this purpose and, as pointed out, only one of the lamps 45 is energized.

The slide changer 23 comprises an elongated housing, as shown generally at 191, which is formed in part by a back plate 192, Figure 23, and a front plate 193, both preferably formed of stainless steel. Rivets 194 serve to hold the plates 192 and 193 to a top track 195 and a bottom track 196 which are preferably formed of aluminum. As shown more clearly in Figure 22, the plates 192 and 193 are positioned in the longitudinal recesses which extend along the sides of the tracks 195 and 196. Rectangular openings 198 and 199 are provided in the back and front plates 192 and 193, respectively, and they are located in alignment with the optical axis 61 of one of the optical systems of the stereo projecting and viewing device 10 when the single slide changer 23 is in operative position in the channel frame 21.

In Figure 19 the next slide 201 to be shown is illustrated in the position where it can be transported into viewing position where the first slide 201 is located. As is conventional, the slide 201 surrounds a transparency 202 on which the objects to be projected or viewed are formed. The slide 201 is arranged to be moved through the elongated housing 91 between the front plate 193 and ribs 203 and 204 which are formed integrally with the tracks 195 and 196, respectively. This is shown more clearly in Figure 22. Bow springs 205, Figure 23, carried by the front plate 193, serve to bias the slide 201 against the ribs 203 and 204 and to hold it in the proper viewing position.

The next slide 201 is moved into viewing position by means of a pusher slide 206, which is preferably formed of stainless steel. It slides between the ribs 203 and 204 on the tracks 195 and 196 and the back plate 192, as shown more clearly in Figure 22. A rectangular opening 207 is formed in the pusher slide 206 for the purpose of uncovering the aperture 198 and 199 formed through the plates 192 and 193.

The slide 201 is moved to the viewing position by means of an upstruck flange 208 from the pusher slide 206. As shown in Figure 19, the flange 208 is arranged to engage one edge of the next slide 201. A handle 209 secured to the pusher slide 206 facilitates manipulation thereof.

In order to eject the slide 201 in the viewing position, a spring detent, shown generally at 210, is employed. The spring detent 210 is formed of a generally rectangular plate 211 of resilient material, such as stainless steel, and it is secured along one edge by rivets 212 to the pusher slide 206. The corners 213 opposite the rivets 212 are turned upwardly, as shown more clearly in Figure 22, for engaging one side of the first slide 201 in the viewing position to eject it therefrom when the pusher slide 206 is operated to transport the next slide 201 to the viewing position. At the same time, the corners 213 are sufficiently resilient and so constructed that when the pusher slide 206 is retrieved, they will ride over the next slide 201 in the viewing position where the next slide is held by the bow springs 205. The movement of the pusher slide 206 is limited by a detent 214 which projects from the back plate 192 and is arranged to engage shoulders 215 and 216 at the ends of an elongated recess 217 on the underside of the pusher slide 206. A threaded recess 217 on the underside of the pusher slide 206. A threaded aperture 218 is located in the left-hand end of the top track 195, Figure 23, for receiving a threaded stud projecting through one of the side plates 38 to hold the single slide changer 23 in operative position in the channel frame 21.

Figure 19 shows one slide in viewing position and the next slide 201 in engagement with the flange 208 ready to be transported to the viewing position.

As the pusher slide 206 is moved to the left, the rectangular opening 207 is moved out of registry with the openings 198—199, and at the same time the spring detent 210 engages the first slide 201 to move it out of viewing position. The first slide is moved jointly with the pusher slide 206 out of the viewing position at the same time that the openings 198—199 are closed by the pusher slide 206. Figure 20 shows the first slide partly ejected and the openings 198—199 partly closed and the next slide 201 being transported to the viewing position.

In Figure 21 of the drawings, the first slide is shown in the fully ejected position and the next slide 201 occupies the viewing position. However, the openings 198—199 are closed by the pusher slide 206. As the pusher slide 206 is withdrawn, the corners 213 of the spring detent 210 slide over the next slide 201 in the viewing position as it is held by the bow springs 205. The opening 207 is brought into registry with the openings 198—199 and the next slide then is projected onto the viewing screen 13 or the remotely positioned screen, as the case may be. The operation can be repeated and successive slides viewed, as may be desired. Because of the provision of the spring detent 210, it is unnecessary to provide an ejector for the last slide.

In describing the operation of the stereo projecting and viewing device 10, it will be assumed that stereo slides are to be shown and that they are to be projected onto the viewing screen 13. Under these circumstances, the stereo slide changer 22 is used and the single slide changer 23 is removed from the channel frame 21. The conversion lens 102 is shifted to the inoperative position shown in Figure 7. The switches 30 and 31 are operated so that the winding 135 of the motor 92 is energized and both lamps 45 are energized. The slide 153 is transported to the viewing position in the manner previously described. The necessary adjustments then are made so as to project properly the stereo images onto the viewing screen 13. It is preferably that the adjustments be made in the following order, although it is not absolutely essential that this order be followed. First, the focus adjustment knob 19 is rotated to shift the projection lens systems 47 so as to bring the images into focus onto the viewing screen 13. Next, the two images should be vertically aligned on the viewing screen 13 for comfortable observation. This adjustment is made by operating the vertical adjustment knob 15 to shift the mirrors 68 slightly relative to each other until the desired vertical alignment is obtained. If both of the images do not appear in proper vertical position on the viewing screen 13, then the tilt control knob 14 is operated to bring them into proper position. Once the stereo projecting and viewing device 10 has been properly adjusted, it usually is unnecessary to move the tilt control knob 14. However, this adjustment is of importance when the stereo images are to be projected on a remotely located screen with the louvered closure 35 and the upper mirror 76 shifted to the alternate position shown by the broken lines in Figure 3.

The horizontal positions of the images on the viewing screen 13 are adjusted by turning the picture separation knob 18. As previously described, this shifts the positions of the projection lens systems 47 relatively horizontally to vary the interocular distance therebetween. In order to obtain proper results, the picture separation knob 18 is adjusted so as to superimpose the two images of the nearest object shown on the viewing screen 13 and let the remaining objects shown thereon take whatever position they will under these circumstances. The stereo projecting and viewing device 10 now is properly adjusted and stereo slides can be viewed on the viewing screen 13 and the stereoscopic effect obtained when the observers use glasses made up of polarizing filters which correspond to the polarizing filter 73.

When it is desired to project the stereoscopic images onto a remotely located screen, the louvered closure 35 and the upper mirror 76 are shifted to the alternate position shown by the broken lines in Figure 3. For this purpose, a special screen with a metallic surface is employed rather than a beaded screen so as to avoid depolarization of the images thrown thereon. Similar adjustments to those previously described are made for projecting the stereo images onto the remotely located screen. As pointed out, it may be necessary to adjust the tilt control knob 14 to properly locate the images on the remotely located screen.

When single slides are to be shown, the switch 31 is operated to the intermediate position where only the motor and one lamp 45 are energized. The stereo slide changer 22 is removed and the single slide changer 23 is inserted in its proper position. The necessary adjustments in the optical system are made and the conversion lens 102 is moved by the changeover knob 20 to the operative position. It will be understood that the single slides can be viewed on the viewing screen 13 or, when the louvered closure 35 and upper mirror 76 are shifted to the alternate position, they can be projected onto a remotely located screen of the beaded type.

Since certain further changes can be made in the foregoing construction and different embodiments of the invention can be made without departing from the spirit and scope thereof, it is intended that all matter shown in the accompanying drawings and described hereinbefore shall be interpreted as illustrative and not in a limiting sense.

What is claimed as new is:

1. A slide changer for transporting stereo slides into and out of viewing position in a stereopticon device having a pair of spaced optical systems comprising, in combination, an elongated housing having a pair of rectangular apertures for positioning respectively in alignment with the spaced optical systems, a pusher slide mounted in said housing for moving a stereo slide into registry with said apertures and a preceding slide out of registry therewith, an auxiliary slide in said housing having a single rectangular aperture between portions adapted to cover said apertures in said housing and adapted in one position to uncover both of said apertures and in another position to cover the same, stop means on said housing limiting the movement of said auxiliary slide to the covered and uncovered positions respectively, friction drive means on one of said pusher and auxiliary slides, and detent means on the other of said pusher and auxiliary slides for engaging said friction drive means only during portions of the movement of said pusher slide for simultaneously covering and uncovering said apertures depending upon the direction in which said pusher slide is moved.

2. A slide changer for transporting stereo slides into and out of viewing position in a stereopticon device having a pair of spaced optical systems comprising, in combination, an elongated housing having a pair of rectangular apertures for positioning respectively in alignment with the spaced optical systems, a pusher slide mounted in said housing for moving a stereo slide into registry with said apertures and a preceding slide out of registry therewith, an auxiliary slide in said housing having a single rectangular aperture between portions adapted to cover said apertures in said housing and adapted in one position to uncover both of said apertures and in another position to cover the same, stop means on said housing limiting the movement of said auxiliary slide to the covered and uncovered positions respectively, a cam having a U-shaped slot rockably mounted on said auxiliary slide, friction drag means between said cam and auxiliary slide, a detent on said pusher slide for entering said U-shaped slot to move said auxiliary slide between said positions while said pusher slide is moved therepast, and detents on said pusher slide for engaging said auxiliary slide in either of said positions thereof for correspondingly limiting the movement of said pusher slide.

3. A slide changer for transporting stereo slides into and out of viewing position in a stereopticon device having a pair of spaced optical systems comprising, in combination, an elongated housing having a pair of rectangular apertures for positioning respectively in alignment with the spaced optical systems, a pusher slide mounted in said housing for moving a stereo slide into registry with said apertures and a preceding slide out of registry therewith, an auxiliary slide in said housing having a single rectangular aperture between portions adapted to cover said apertures in said housing and adapted in one position to uncover both of said apertures and in another position to cover the same, stop means on said housing limiting the movement of said auxiliary slide to the covered and uncovered positions, respectively, friction drive means on one of said pusher and auxiliary slides, detent means on the other of said pusher and auxiliary slides for engaging said friction drive means only during portions of the movement of said pusher slide for simultaneously covering and uncovering said apertures depending upon the direction in which said pusher slide is moved, and detent means on said pusher slide for engaging said auxiliary slide in either of said positions thereof for correspondingly limiting the movement of said pusher slide.

References Cited in the file of this patent

UNITED STATES PATENTS

| 720,099 | Barbour | Feb. 10, 1903 |
| 786,883 | Edmonds | Apr. 11, 1905 |
| 1,035,872 | Goodrich | Aug. 20, 1912 |
| 2,122,649 | Kahn | July 5, 1938 |
| 2,213,779 | Young | Sept. 3, 1940 |
| 2,364,788 | Harvey et al. | Dec. 12, 1944 |
| 2,634,653 | Barth | Apr. 14, 1953 |
| 2,808,759 | Herrmann | Oct. 8, 1957 |
| 2,808,760 | Gile | Oct. 8, 1957 |

FOREIGN PATENTS

| 23,670 | Great Britain | of 1893 |